(12) United States Patent
Kang et al.

(10) Patent No.: US 9,134,824 B2
(45) Date of Patent: Sep. 15, 2015

(54) TOUCH SENSING DEVICE AND DOUBLE SAMPLING METHOD THEREOF

(71) Applicant: LG Display Co., Ltd., Seoul (KR)

(72) Inventors: Hyeongwon Kang, Seoul (KR); Jaehun Jun, Gwangmyeong (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 13/728,636

(22) Filed: Dec. 27, 2012

(65) Prior Publication Data

US 2013/0249825 A1    Sep. 26, 2013

(30) Foreign Application Priority Data

Mar. 20, 2012    (KR) .................. 10-2012-0028468

(51) Int. Cl.
G06F 3/041    (2006.01)
G06F 3/0354    (2013.01)
G06F 3/044    (2006.01)

(52) U.S. Cl.
CPC ............ *G06F 3/03547* (2013.01); *G06F 3/044* (2013.01); *G06F 3/0412* (2013.01); *G06F 3/0418* (2013.01)

(58) Field of Classification Search
CPC combination set(s) only.
See application file for complete search history.

(56) References Cited

U.S. PATENT DOCUMENTS 6,075,520 A * 6/2000 Inoue et al. .................. 345/173

* cited by examiner

*Primary Examiner* — Joseph Haley
*Assistant Examiner* — Ifedayo Iluyomade
(74) *Attorney, Agent, or Firm* — Fenwick & West LLP

(57) ABSTRACT

A touch sensing device includes a touch screen including Tx lines, Rx lines crossing the Tx lines, and touch sensors formed at crossings of the Tx lines and the Rx lines, a Tx driving circuit for supplying a driving signal to each of the Tx lines N times, where N is a positive integer equal to or greater than 2, and an Rx driving circuit for double sampling signals received through the Rx lines in one period of the driving signal. The Rx driving circuit includes a multiplexer which receives first and second signals and switches on or off a signal transmission path of the first and second signals, and an integrator which samples and integrates the first and second signals received from the multiplexer.

21 Claims, 11 Drawing Sheets

TOUCH SENSING DEVICE AND DOUBLE SAMPLING METHOD THEREOF

This application claims the benefit of Korean Patent Application No. 10-2012-0028468 filed on Mar. 20, 2012, the entire contents of which is incorporated herein by reference for all purposes as if fully set forth herein.

BACKGROUND OF THE INVENTION

1. Field of the Invention

Embodiments of the invention relate to a touch sensing device and a double sampling method thereof.

2. Discussion of the Related Art

User interface (UI) is configured so that users are able to communicate with various electronic devices and thus can easily and comfortably control the electronic devices as they desire. Examples of the user interface include a keypad, a keyboard, a mouse, an on-screen display (OSD), and a remote controller having an infrared communication function or a radio frequency (RF) communication function. User interface technologies have continuously expanded to increase user's sensibility and handling convenience. The user interface has been recently developed to include touch UI, voice recognition UI, 3D UI, etc.

The touch UI has been used in portable information appliances and has been expanded to the use of home appliances. There is a mutual capacitive touch screen as an example of a touch screen for implementing the touch UI. The mutual capacitive touch screen can sense proximity input as well as touch input and also recognize respective multi-touch (or multi-proximity) inputs.

A method for sensing the touch screen input includes sensing an output voltage to a touch sensor and comparing a voltage change amount before and after a touch input with a predetermined threshold voltage or counting the change in voltage. Other methods have been known. As a method for reducing an influence of noise added in the touch sensor of the mutual capacitive touch screen, there is a method for removing DC offset included in a received voltage of the touch sensor using a digital-to-analog converter (DAC). In the mutual capacitive touch screen, the noise includes high frequency noise, DC offset, and interference between Tx or Rx channels, etc. The noise reduces a signal-to-noise ratio (often abbreviated SNR) of a signal read from the touch sensor and thus reduces the sensitivity of the touch sensor. If a ground of a touch object, for example, a finger is shaken, the noise is generated along a Tx line passing through a touch point. Because the number and the amount of noise increase as the number of multi-touch inputs increases, it is difficult to distinguish the touch points from one another.

SUMMARY OF THE INVENTION

Embodiments of the invention provide a touch sensing device and a double sampling method thereof capable of increasing a signal-to-noise ratio of a touch screen.

In one aspect, there is a touch sensing device including a touch screen including Tx lines, Rx lines crossing the Tx lines, and touch sensors formed at crossings of the Tx lines and the Rx lines, a Tx driving circuit configured to supply a driving signal to each of the Tx lines N times, where N is a positive integer equal to or greater than 2, and an Rx driving circuit configured to double sample signals received through the Rx lines in one period of the driving signal.

The Rx driving circuit includes a multiplexer configured to receive first and second signals and switch on or off a signal transmission path of the first and second signals, and an integrator configured to sample and integrate the first and second signals received from the multiplexer.

In another aspect, there is a double sampling method of the touch sensing device including supplying a driving signal to each of the Tx lines N times, where N is a positive integer equal to or greater than 2, and double sampling signals received through the Rx lines in one period of the driving signal.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
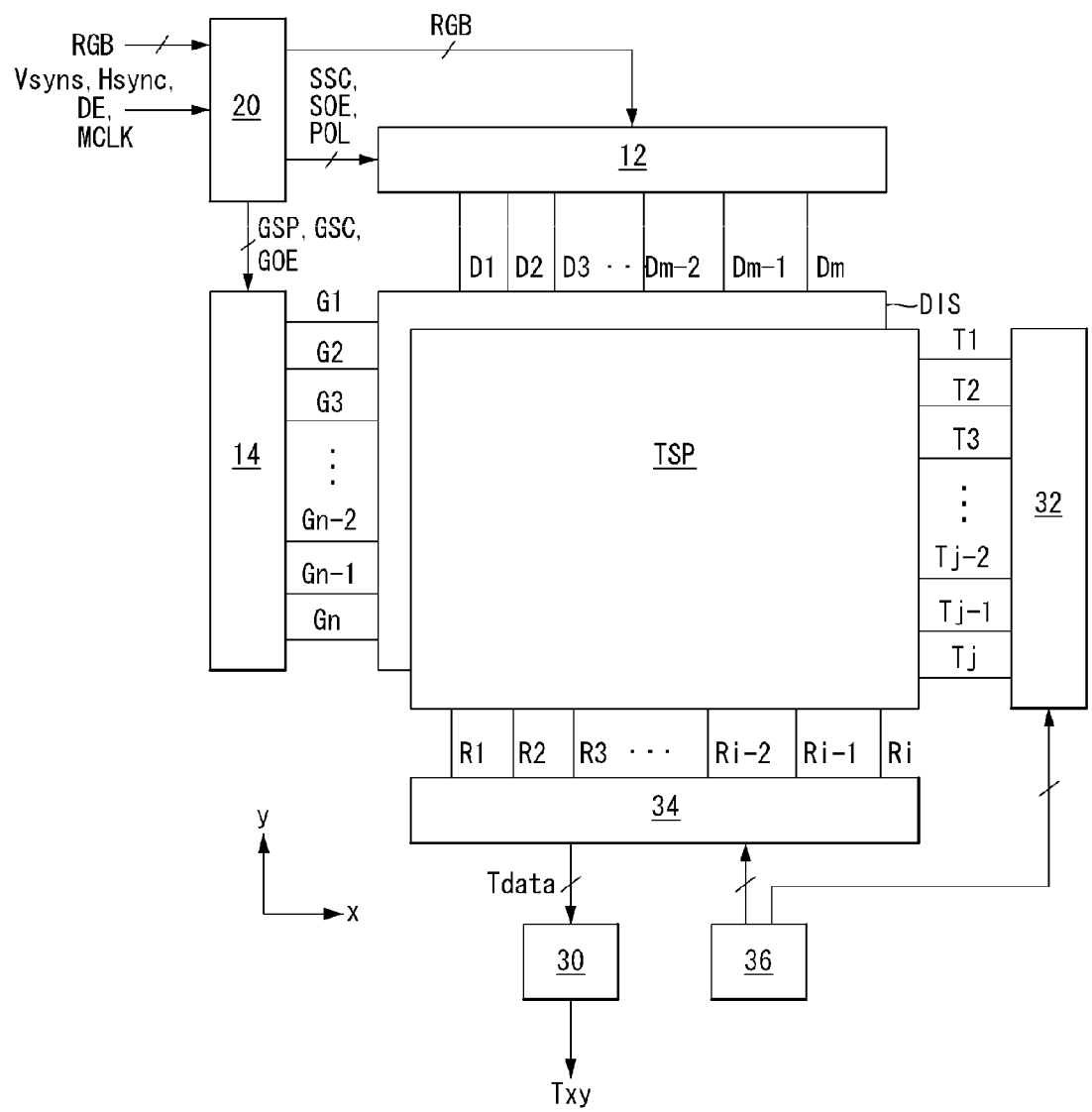
FIG. 1 is a block diagram of a touch sensing device according to an example embodiment of the invention.

Reference will now be made in detail to embodiments of the invention, examples of which are illustrated in the accompanying drawings. Wherever possible, the same reference numbers will be used throughout the drawings to refer to the same or like parts. It will be paid attention that detailed description of known arts will be omitted if it is determined that the arts can mislead the embodiments of the invention.

As shown in FIGS. 1 to 4, a display device according to an example embodiment of the invention includes a display panel DIS, a display driving circuit, a display timing controller 20, a touch screen TSP, a touch screen driving circuit, a touch coordinate calculation unit 30, etc. All components of the display device are operatively coupled and configured.

The display device according to the embodiment of the invention may be implemented based on a flat panel display, such as a liquid crystal display (LCD), a field emission display (FED), a plasma display panel (PDP), an organic light emitting diode (OLED) display, and an electrophoresis display (EPD). In the following description, the embodiment of the invention will be described using the liquid crystal display as an example of the flat panel display. Other flat panel displays may be used.

The display panel DIS includes a lower substrate GLS2, an upper substrate GLS1, and a liquid crystal layer formed between the lower substrate GLS2 and the upper substrate GLS1. The lower substrate GLS2 of the display panel DIS includes a plurality of data lines D1 to Dm, where m is a natural number, a plurality of gate lines (or scan lines) G1 to Gn crossing the data lines D1 to Dm, where n is a natural number, a plurality of thin film transistors (TFTs) formed at crossings of the data lines D1 to Dm and the gate lines G1 to Gn, a plurality of pixel electrodes for charging liquid crystal cells to a data voltage, a plurality of storage capacitors, each of which is connected to the pixel electrode and holds a voltage of the liquid crystal cell, etc.

Pixels of the display panel DIS are respectively formed in pixel areas defined by the data lines D1 to Dm and the gate lines G1 to Gn to form a matrix structure. The liquid crystal cell of each pixel is driven by an electric field generated depending on a voltage difference between the data voltage supplied to the pixel electrode and a common voltage supplied to a common electrode, thereby adjusting an amount of incident light transmitted by the liquid crystal cell. The TFTs are turned on in response to a gate pulse (or a scan pulse) from the gate lines G1 to Gn, thereby supplying the voltage from the data lines D1 to Dm to the pixel electrodes of the liquid crystal cells.

The upper substrate GLS1 of the display panel DIS may include black matrixes, color filters, etc. The lower substrate GLS2 of the display panel DIS may be configured in a COT (color filter on TFT) structure. In this instance, the black matrixes and the color filters may be formed on the lower substrate GLS2 of the display panel DIS.

Polarizing plates POL1 and POL2 are respectively attached to the upper and lower substrates GLS1 and GLS2 of the display panel DIS. Alignment layers for setting a pre-tilt angle of liquid crystals are respectively formed on the inner surfaces contacting the liquid crystals in the upper and lower substrates GLS1 and GLS2 of the display panel DIS. A column spacer may be formed between the upper and lower substrates GLS1 and GLS2 of the display panel DIS to keep cell gaps of the liquid crystal cells constant.

A backlight unit may be disposed under a back surface of the display panel DIS. The backlight unit may be configured as one of an edge type backlight unit and a direct type backlight unit to provide light to the display panel DIS. The display panel DIS may be implemented in any known mode including a twisted nematic (TN) mode, a vertical alignment (VA) mode, an in-plane switching (IPS) mode, a fringe field switching (FFS) mode, etc.

The display driving circuit includes a data driving circuit 12 and a scan driving circuit 14. The display driving circuit applies a video data voltage of an input image to the pixels of the display panel DIS. The data driving circuit 12 converts digital video data RGB received from the display timing controller 20 into positive and negative analog gamma compensation voltages and outputs the data voltage. The data driving circuit 12 then supplies the data voltage to the data lines D1 to Dm. The scan driving circuit 14 sequentially supplies the gate pulse synchronized with the data voltage to the gate lines G1 to Gn and selects a line of the display panel DIS to which the data voltage will be applied.

The display timing controller 20 receives timing signals, such as a vertical sync signal Vsync, a horizontal sync signal Hsync, a data enable DE, and a main clock MCLK, from an external host system. The display timing controller 20 generates a data timing control signal and a scan timing control signal for respectively controlling operation timings of the data driving circuit 12 and the scan driving circuit 14 using the timing signals. The data timing control signal includes a source sampling clock SSC, a source output enable SOE, a polarity control signal POL, etc. The scan timing control signal includes a gate start pulse GSP, a gate shift clock GSC, a gate output enable GOE, etc.

Figure 2:
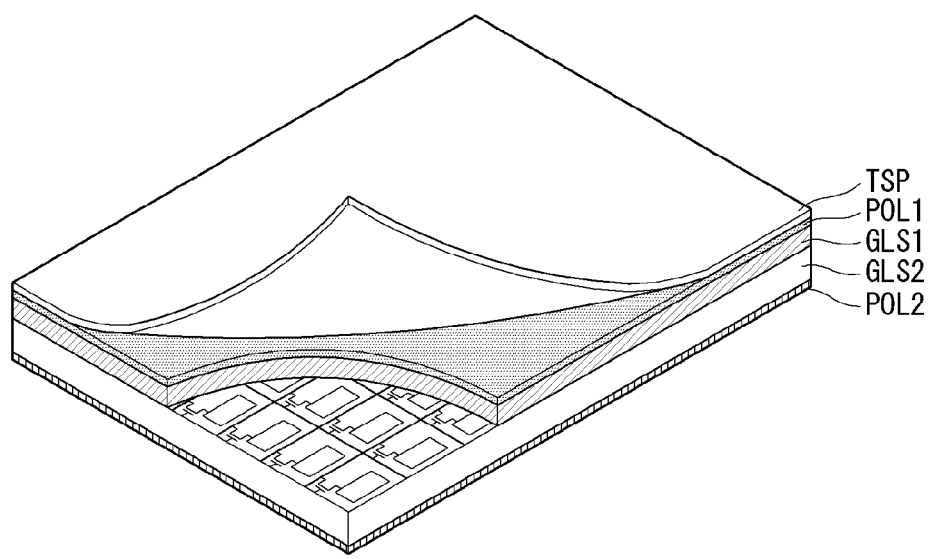
FIGS. 2 to 4 illustrate various combinations of a touch screen and a display panel according to an example embodiment of the invention.
Figure 3:
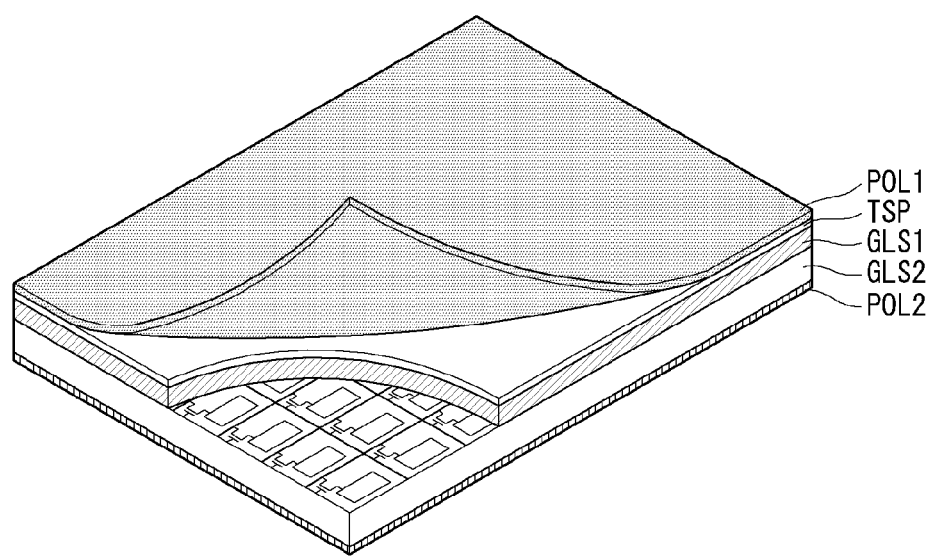
Figure 4:
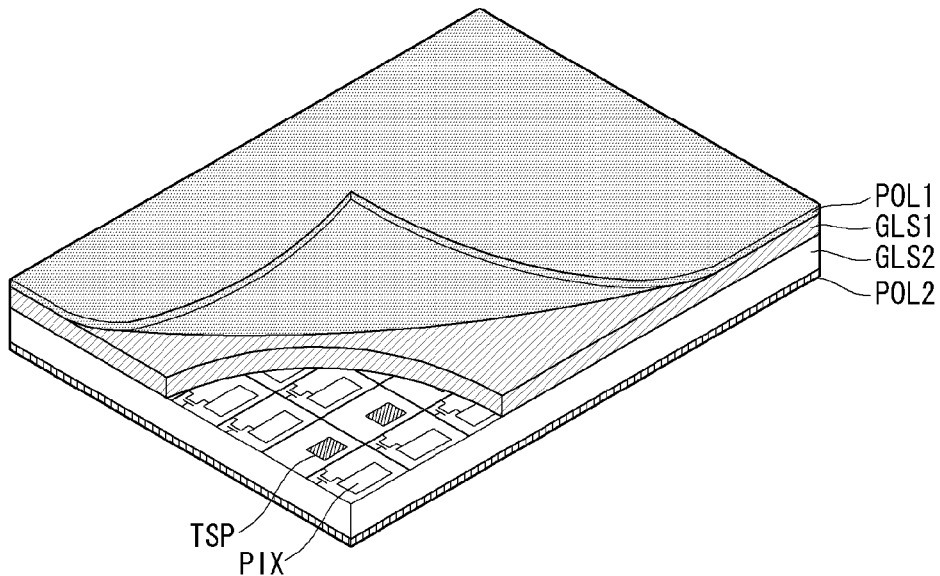

As shown in FIG. 2, the touch screen TSP may be attached on the upper polarizing plate POL1 of the display panel DIS. Alternatively, as shown in FIG. 3, the touch screen TSP may be formed between the upper polarizing plate POL1 and the upper substrate GLS1. Alternatively, as shown in FIG. 4, touch sensors of the touch screen TSP may be formed on the lower substrate GLS2 along with a pixel array of the display panel DIS in an in-cell type. In FIGS. 2 to 4, 'PIX' denotes the pixel electrode of the liquid crystal cell.

The touch screen TSP includes Tx lines T1 to Tj, where j is a positive integer less than n, Rx lines R1 to Ri crossing the Tx lines T1 to Tj, where i is a positive integer less than m, and i×j touch sensors TSN formed at crossings of the Tx lines T1 to Tj and the Rx lines R1 to Ri. Each of the touch sensors TSN has a mutual capacitance.

The touch screen driving circuit supplies a driving signal (or Tx pulse) to the Tx lines T1 to Tj and successively samples an output voltage of the touch sensor twice in one period (or one cycle) of the driving signal, thereby sensing the amount of change in the output voltage of the touch sensor. The touch screen driving circuit includes a Tx driving circuit 32, an Rx driving circuit 34, and a touch screen timing controller (hereinafter referred to as a "TSP timing controller") 36. The Tx driving circuit 32, the Rx driving circuit 34, and the TSP timing controller 36 may be integrated in one readout integrated circuit (ROIC). The touch coordinate calculation unit 30 may be also integrated in the ROIC.

Figure 8:
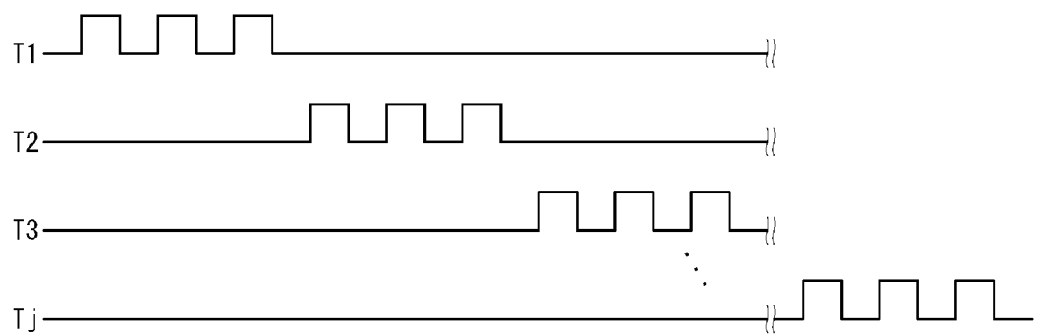
FIG. 8 is a waveform diagram showing an example of a driving signal supplied to Tx lines of a touch screen.

The Tx lines T1 to Tj are connected to Tx channels of the Tx driving circuit 32. The Tx driving circuit 32 selects a Tx channel, which will output the driving signal, in response to a Tx setup signal received from the TSP timing controller 36 and supplies the driving signal to the Tx lines T1 to Tj connected to the selected Tx channel. The Tx lines T1 to Tj are charged during a high potential period of the driving signal and supplies charges to the touch sensors TSN. The Tx lines T1 to Tj are charged during a low potential period of the driving signal. As shown in FIG. 8, the driving signal is successively supplied to each of the Tx lines T1 to Tj N times, where N is a positive integer equal to or greater than 2, so that an output voltage of the touch sensor may be accumulated in an integrator through an Rx channel.

The Rx lines R1 to Ri are connected to Rx channels of the Rx driving circuit 34. The Rx driving circuit 34 selects the Rx channel, which will receive the output voltage of the touch sensor, in response to an Rx setup signal received from the TSP timing controller 36. The Rx driving circuit 34 successively samples signals received through the Rx channels twice in each period of the driving signal and accumulates the sampled signals in the integrator as shown in steps S1 and S2 of FIG. 5.

In related art, a Rx driving circuit sampled the output voltage of the touch sensor once in one period of the driving signal. On the other hand, the Rx driving circuit 34 according to the embodiment of the invention samples the output voltage of the touch sensor when the Tx lines T1 to Tj are charged to a high potential voltage of the driving signal, and also samples the output voltage of the touch sensor when the Tx lines T1 to Tj are charged to a low potential voltage. As a result, the touch sensing device according to the embodiment of the invention further increases the output voltage accumulated in the integrator as compared to the related art, thereby improving a signal-to-noise ratio (SNR).

Figure 5:
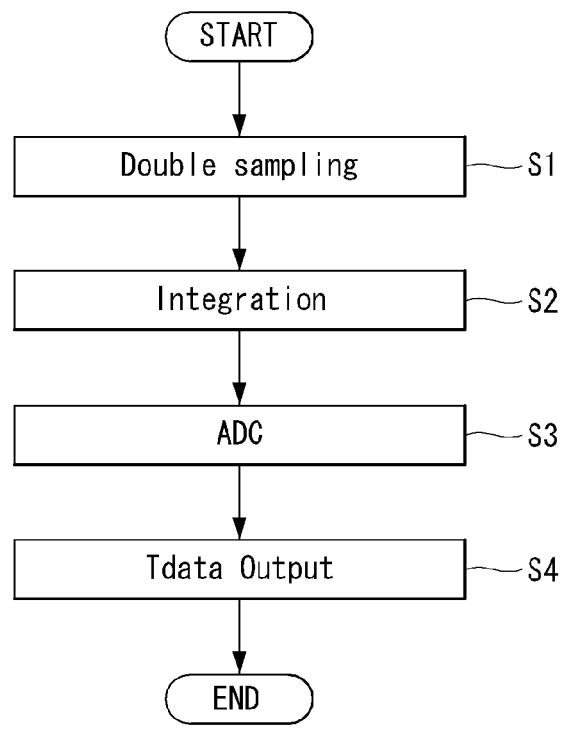
FIG. 5 is a flow chart sequentially illustrating an operation of an Rx driving circuit shown in FIG. 1.

The Rx driving circuit 34 converts the voltage accumulated in the integrator into digital data Tdata using an analog-to-digital converter (ADC) connected to an output terminal of the integrator in step S3 of FIG. 5. The Rx driving circuit 34 supplies the digital data Tdata as touch raw data to the touch coordinate calculation unit 30 in step S4 of FIG. 5.

The TSP timing controller 36 generates the Tx setup signal for setting the Tx channel to output the driving signal and the Rx setup signal for setting the Rx channel to receive the voltage of the touch sensor. Further, the TSP timing controller 36 generates timing control signals for controlling operation timings of the Tx driving circuit 32 and the Rx driving circuit 34.

The touch coordinate calculation unit 30 compares the digital data Tdata received from the Rx driving circuit 34 with a previously determined threshold value and determines the digital data Tdata equal to or greater than the threshold value as touch data obtained from the touch sensors at a real touch input position. The touch coordinate calculation unit 30 gives an identification (ID) code to each of the touch inputs and analyzes the touch data using a previously determined touch recognition algorithm. The touch coordinate calculation unit 30 calculates a coordinate of each of the touch inputs. The touch coordinate calculation unit 30 transmits touch coordinate data Txy including the coordinate of each of the touch inputs to the host system. The touch coordinate calculation unit 30 may be implemented as a microcontroller unit (MCU).

The host system may be implemented as one of a navigation system, a set-top box, a DVD player, a Blu-ray player, a personal computer (PC), a home theater system, a broadcasting receiver, and a phone system. The host system includes a system on chip (SoC), in which a scaler is embedded, and thus converts image data into a format suitable for displaying on the display panel DIS. Further, the host system runs an application associated with a coordinate value of each of the touch inputs received from the touch coordinate calculation unit 30.

Figure 6:
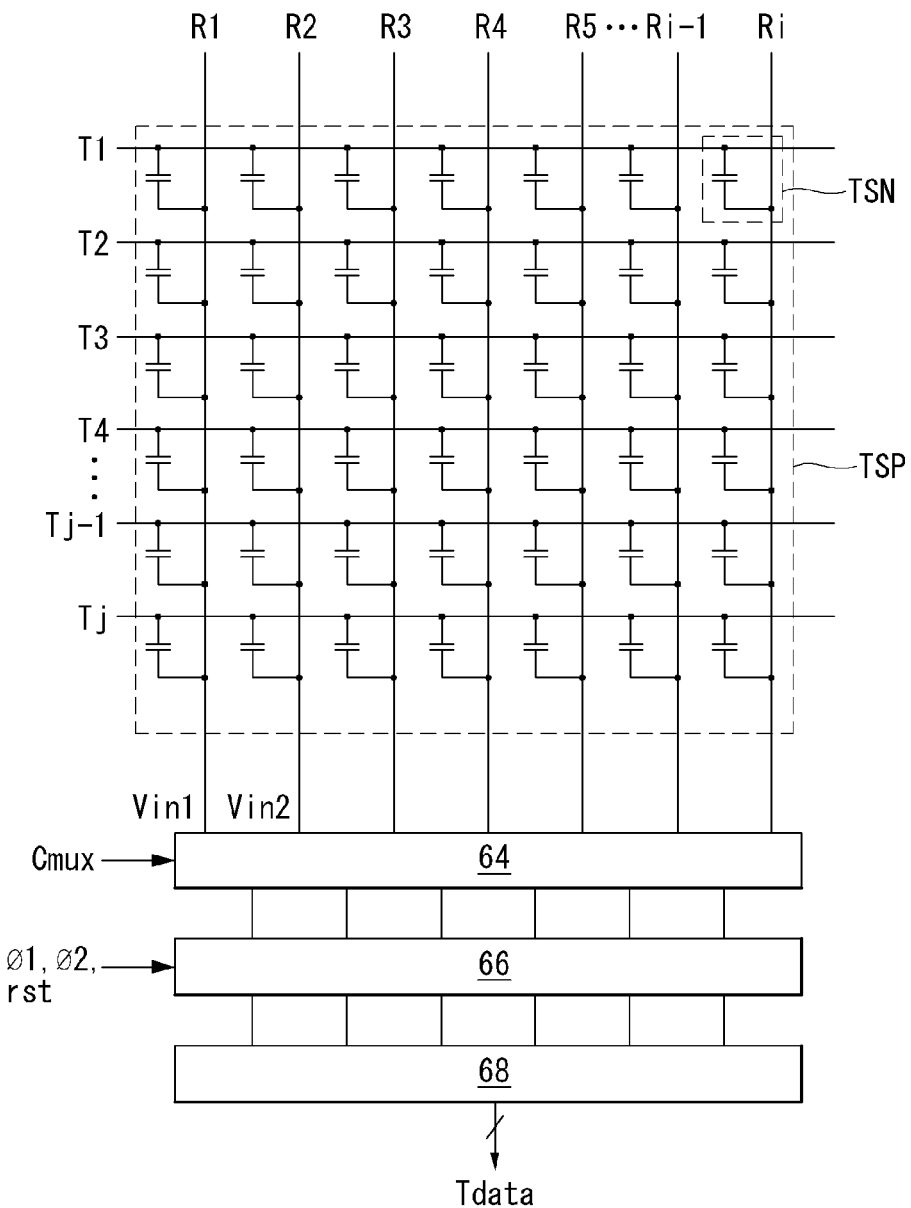
FIG. 6 is a circuit diagram of an Rx driving circuit according to a first embodiment of the invention.
Figure 7:
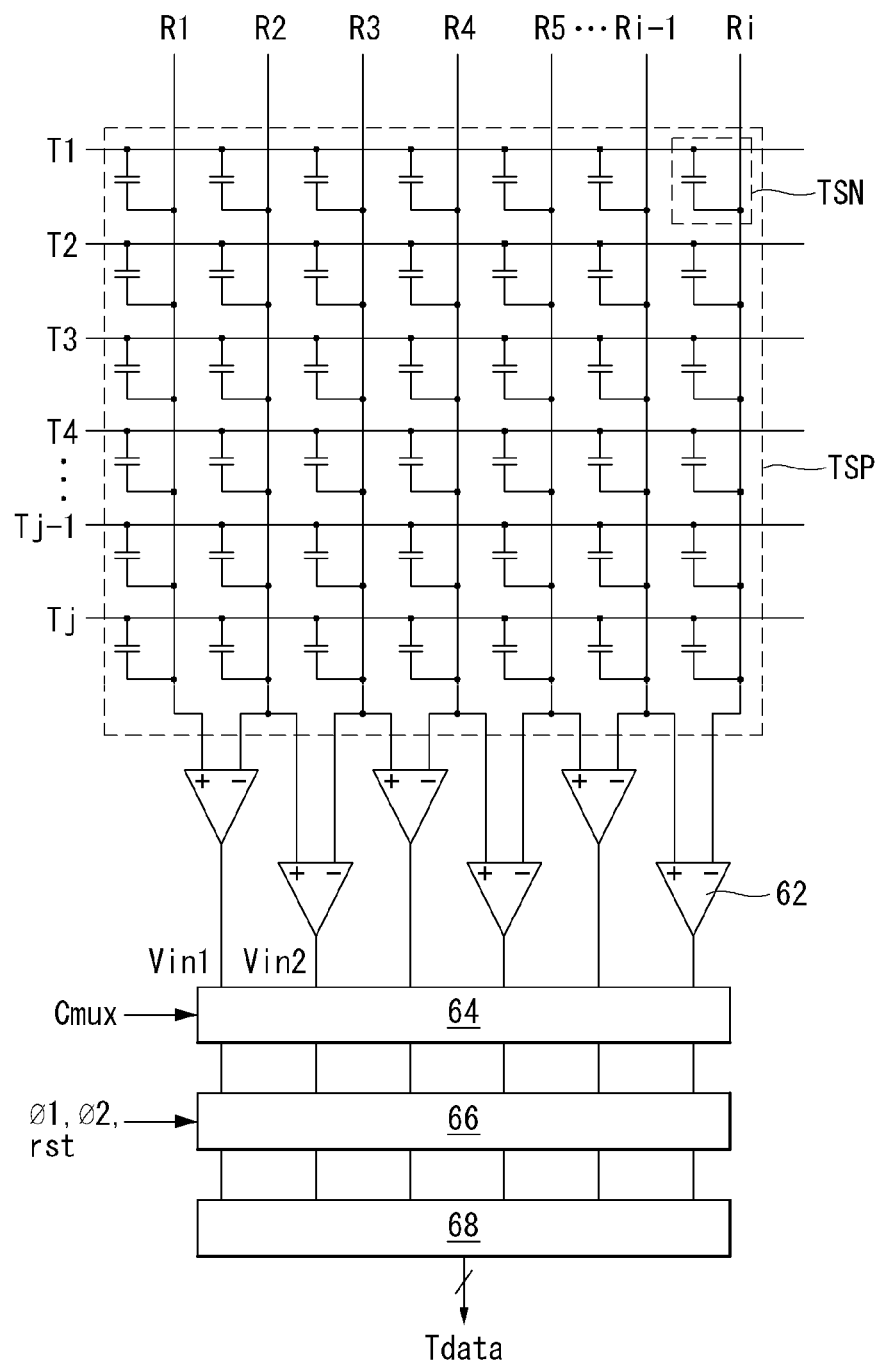
FIG. 7 is a circuit diagram of an Rx driving circuit according to a second embodiment of the invention.

FIG. 6 is a circuit diagram of the Rx driving circuit 34 according to a first embodiment of the invention. FIG. 7 is a circuit diagram of the Rx driving circuit 34 according to a second embodiment of the invention.

As shown in FIGS. 6 and 7, the Rx driving circuit 34 includes a multiplexer 64 formed between the Rx lines R1 to Ri and an integrator 66, the integrator 66 formed between the multiplexer 64 and an ADC 68, etc.

When the Tx lines T1 to Tj are charged to the high potential voltage of the driving signal, the multiplexer 64 supplies input signals received through the Rx lines R1 to Ri to the integrator 66. When the voltages of the Tx lines T1 to Tj are the low potential voltages, the multiplexer 64 switches on or off a transmission path of the input signals so that polarities of the input signals are inverted, and supplies the inverted input signals to the integrator 66. The integrator 66 successively samples the signal received through the multiplexer 64 twice in one period of the driving signal. The ADC 68 converts an output voltage of the integrator 66 into the digital data Tdata and transmits the digital data Tdata to the touch coordinate calculation unit 30.

As shown in FIG. 7, differential amplifiers 62, which are pre-amplifiers, may be installed between the Rx lines R1 to Ri and the multiplexer 64. Each differential amplifier 62 amplifies a voltage difference between signals input through the adjacent Rx lines and outputs the amplified voltage difference. Each differential amplifier 62 amplifies the voltage difference between the signals input through the adjacent Rx lines, thereby reducing noise resulting from a parasitic capacitance of the touch screen TSP. Hence, the differential amplifiers 62 improve the signal-to-noise ratio. Each differential amplifier 62 amplifies a difference between voltages of signals obtained from the touch sensors, which are adjacent to one another in a direction of the Tx lines through a positive output terminal and a negative output terminal, and thus may be implemented as a fully differential amplifier, which outputs voltages of positive and negative signals having a complementary relation.

Figure 9:
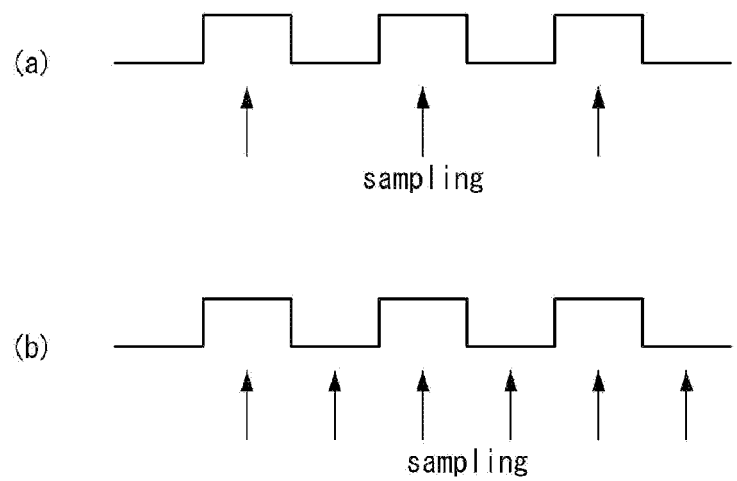
FIG. 9 is a waveform diagram comparing a sampling timing of a driving signal in a related art with a sampling timing of a driving signal in an embodiment of the invention.

FIG. 8 is a waveform diagram showing an example of the driving signal supplied to the Tx lines of the touch screen TSP. FIG. 9 is a waveform diagram comparing a sampling timing of the driving signal in a related art with a sampling timing of the driving signal in the embodiment of the invention.

As shown in FIGS. 8 and 9, the driving signal is successively supplied to each of the Tx lines T1 to Tj N times, and is sequentially supplied to the Tx lines T1 to Tj. The Tx lines T1 to Tj are charged to the high potential voltage of the driving signal in one period of the driving signal and then are charged to the low potential voltage applied when the driving signal is not applied.

As shown in part (a) of FIG. 9, only when the Tx lines T1 to Tj are charged to the high potential voltage of the driving signal, the related art Rx driving circuit samples voltages of signals received through the Rx lines R1 to Ri and accumulates the sampled voltages in a capacitor of the integrator. If the related art Rx driving circuit double samples an output voltage of the touch sensor when the Tx lines are charged to the high potential voltage and are charged to the low potential voltage in one period of the driving signal, voltages of different polarities are successively supplied to the integrator. Therefore, the voltages of the different polarities are not accumulated in the integrator and cancel each other out. Thus, the related art Rx driving circuit samples the output voltage of the touch sensor only in a period, in which the Tx lines T1 to Tj are charged to the high potential voltage in one period of the driving signal. Namely, the related art Rx driving circuit cannot perform the double sampling because of the cancellation of the voltages of the integrator.

As shown in part (b) of FIG. 9, when the Tx lines T1 to Tj are charged to the high potential voltage of the driving signal, the Rx driving circuit 34 according to the embodiment of the invention samples input signals and accumulates the sampled input signals in the integrator 66. Subsequently, when the Tx lines T1 to Tj are charged to the low potential voltage, the Rx driving circuit 34 samples input signals, inverts polarities of the input signals using the multiplexer 64, and accumulates the inverted input signals in the integrator 66. As a result, the Rx driving circuit 34 according to the embodiment of the invention successively samples the input signals twice in one period of the driving signal and accumulates voltages of the sampled input signals in the integrator 66, thereby performing the double sampling.

Figure 10:
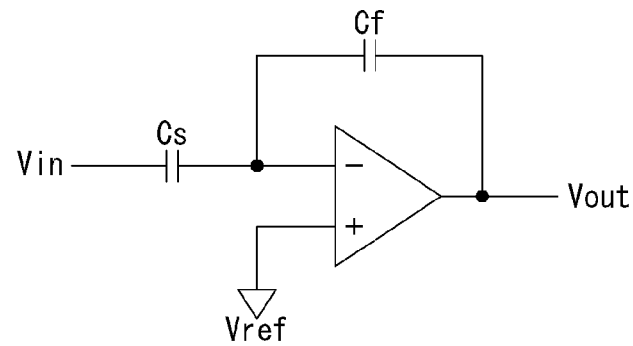
FIG. 10 illustrates an example of a typical integrator.
Figure 11:
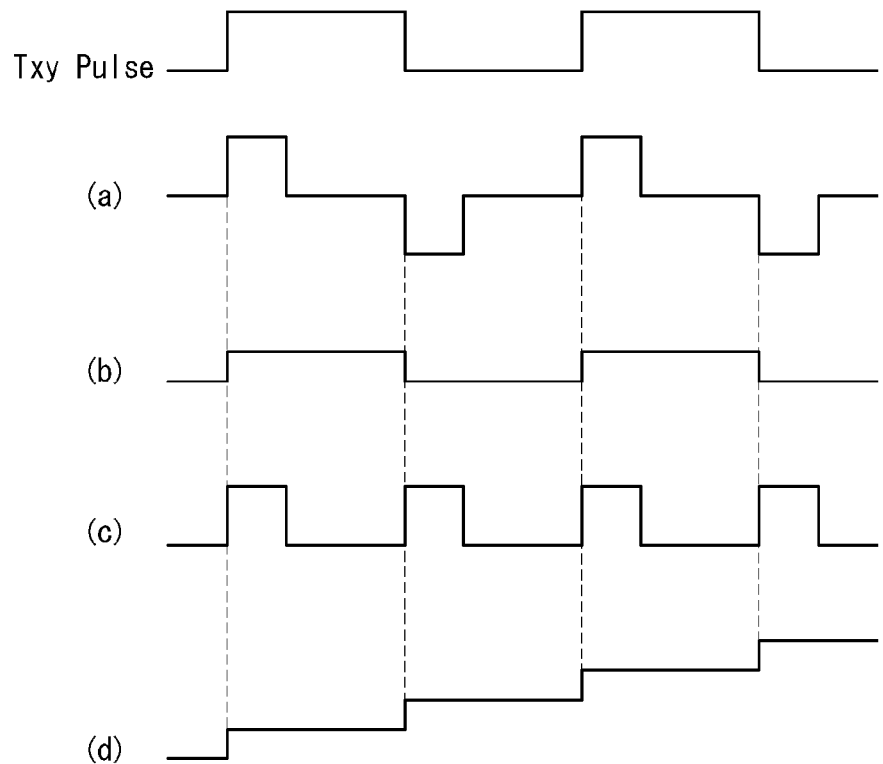
FIG. 11 illustrates a comparison between a related art and an embodiment of the invention in a sampling timing and an integration waveform.

FIG. 10 illustrates an example of a typical integrator. FIG. 11 illustrates a comparison between the related art and the embodiment of the invention in a sampling timing and an integration waveform.

An output Vout of an integrator shown in FIG. 10 is 'Vout=Vin×(Cs/Cf)+Δ' when an input signal Vin is a positive voltage, where Cs is a sampling capacitor, Cf is a feedback capacitor, and Δ is a noise component which is input along with the input signal Vin. When a polarity of the input signal Vin changes to a negative polarity, the output Vout of the integrator changes to 'Vout=−Vin×(Cs/Cf)+Δ'. As above, when the polarity of the input signal Vin is periodically inverted, a polarity of a voltage sampled by the sampling capacitor Cs is inverted as shown in part (a) of FIG. 11. Each time the polarity of the voltage charged to the sampling capacitor Cs is inverted, the voltages accumulated in the feedback capacitor Cf of the integrator cancel out as shown in part (b) of FIG. 11, but the noises are accumulated. Thus, when the input signal Vin, of which the polarity is periodically inverted, is accumulated in the integrator, the signal-to-noise ratio is reduced. In the related art, a voltage accumulated in the integrator was sampled once for a period of time, in which the Tx lines are charged to the high potential voltages, in one period of the driving signal, so that the voltage accumulated in the integrator does not cancel out by a voltage of an opposite polarity.

As shown in part (c) of FIG. 11, the Rx driving circuit 34 according to the embodiment of the invention controls the voltages input to the integrator using the multiplexer 64 so that they have the same polarity, thereby accumulating the double sampled voltages in the integrator in one period of the driving signal. Thus, as shown in part (d) of FIG. 11, the Rx driving circuit 34 according to the embodiment of the invention performs the double sampling, which successively accumulates the sampled voltages in the integrator twice in one period of the driving signal, thereby increasing the integration effect by more than twice as compared to the related art. As a result, the signal-to-noise ratio may be improved.

Figure 12:
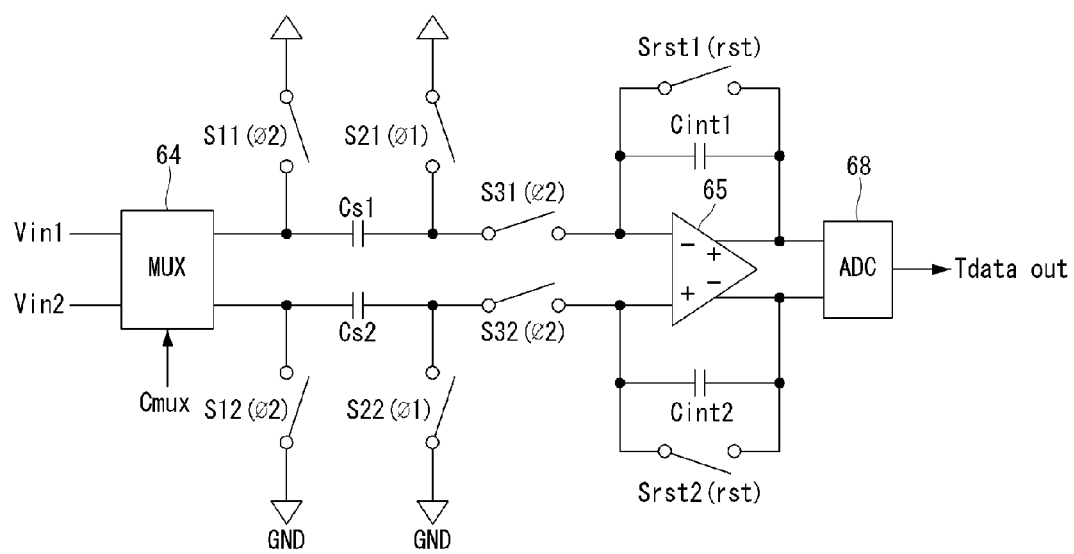
FIG. 12 is a circuit diagram showing in detail an Rx driving circuit according to an example embodiment of the invention.
Figure 13:
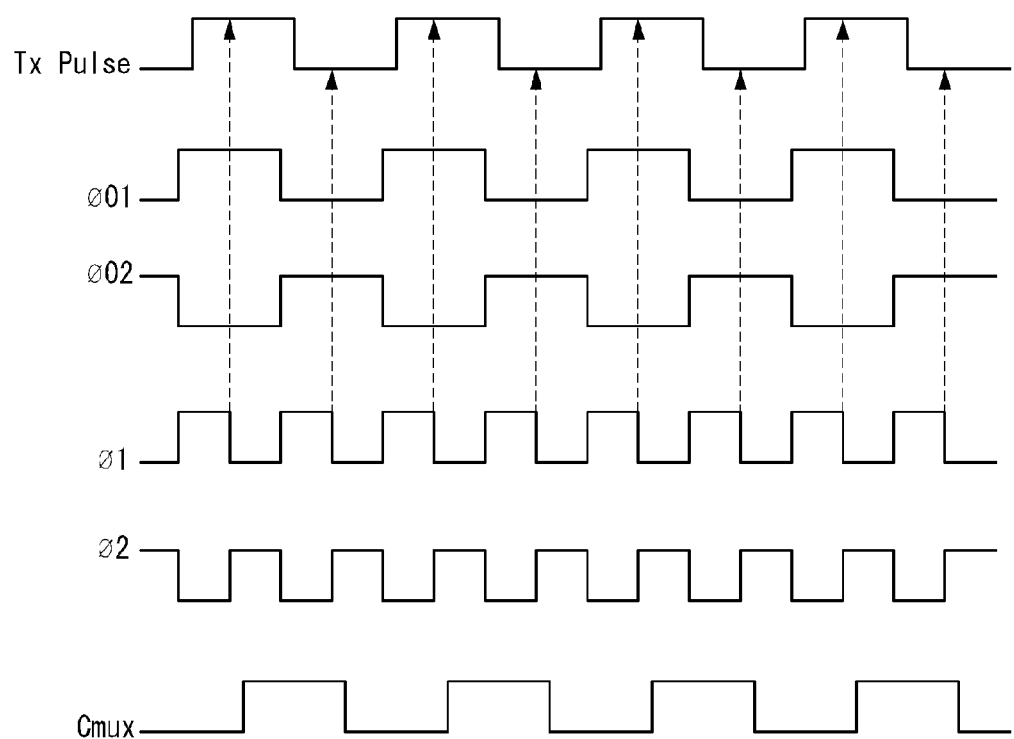
FIG. 13 is a waveform diagram showing a control signal of an Rx driving circuit according to an example embodiment of the invention.
Figure 14:
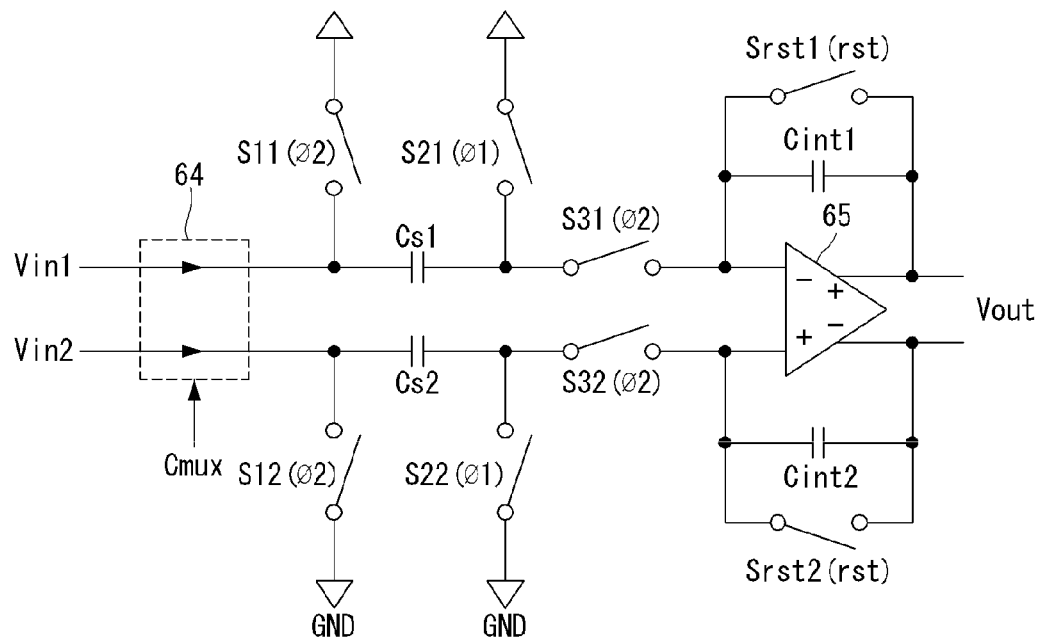
FIGS. 14 and 15 are circuit diagrams showing an operation of a multiplexer.
Figure 15:
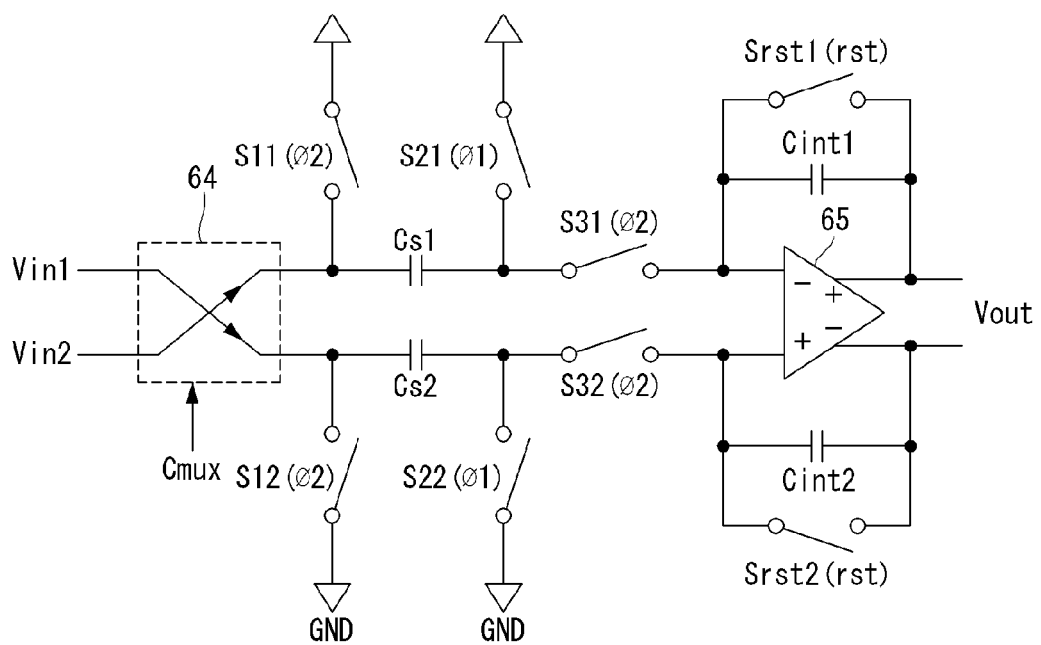

FIG. 12 is a circuit diagram showing in detail the Rx driving circuit according to the embodiment of the invention. FIG. 13 is a waveform diagram showing a control signal of the Rx driving circuit according to the embodiment of the invention. FIGS. 14 and 15 are circuit diagrams showing an operation of the multiplexer.

As shown in FIGS. 12 to 15, the integrator 66 includes sampling capacitors Cs1 and Cs2 and switches S11, S21, S31, S12, S22, and S32, which are connected between the multiplexer 64 and a differential amplifier 65. Capacitors Cint1 and Cint2 for accumulating the sampled voltages and reset switches Srst1 and Srst2 are connected between input terminals and output terminals of the differential amplifier 65.

The multiplexer 64 includes first and second input terminals, first and second output terminals, and switch elements for switching on or off a signal transmission path between the input terminals and the output terminals. The first and second input terminals of the multiplexer 64 may receive first and second signals Vin1 and Vin2 through the Rx lines R1 to Ri as shown in FIG. 6. Alternatively, as shown in FIG. 7, the first and second input terminals of the multiplexer 64 may receive the first and second signals Vin1 and Vin2 which are received through the Rx lines R1 to Ri and are amplified by the differential amplifiers 62. The first signal Vin1 is input to the first input terminal of the multiplexer 64, and the second signal Vin2 is input to the second input terminal of the multiplexer 64. The multiplexer 64 switches on or off a signal transmission path of input signals in response to a MUX control signal Cmux received from the TSP timing controller 36. As shown in FIG. 13, a period of the MUX control signal Cmux is substantially the same as the period of the driving signal. A phase of the MUX control signal Cmux is later than a phase of the driving signal by about 45° to 180°.

As shown in FIG. 14, when a voltage of the MUX control signal Cmux is a low logic level, the multiplexer 64 connects the first input terminal to the first output terminal and connects the second input terminal to the second output terminal. On the other hand, as shown in FIG. 15, when the voltage of the MUX control signal Cmux is a high logic level, the multiplexer 64 connects the first input terminal to the second output terminal and connects the second input terminal to the first output terminal. The MUX control signal Cmux rises in the high potential period of the driving signal and falls in the low potential period of the driving signal.

The first sampling capacitor Cs1 is connected between the first output terminal of the multiplexer 64 and a first input terminal (−) of the differential amplifier 65. The first sampling capacitor Cs1 samples and stores a voltage from the first output terminal of the multiplexer 64 and supplies the sampled voltage to the first input terminal (−) of the differential amplifier 65. The second sampling capacitor Cs2 is connected between the second output terminal of the multiplexer 64 and a second input terminal (+) of the differential amplifier 65. The second sampling capacitor Cs2 samples and stores a voltage from the second output terminal of the multiplexer 64 and supplies the sampled voltage to the second input terminal (+) of the differential amplifier 65.

The first switch S11 is connected between the first output terminal of the multiplexer 64 and a first electrode of the first sampling capacitor Cs1, and a ground level voltage source GND. The first switch S11 is turned on in response to a pulse of a second switch control signal φ2. The second switch S21 is connected between a second electrode of the first sampling capacitor Cs1 and the ground level voltage source GND. The second switch S21 is turned on in response to a pulse of a first switch control signal φ1. The third switch S31 is connected between the second electrode of the first sampling capacitor Cs1 and the first input terminal (−) of the differential amplifier 65. The third switch S31 is turned on in response to the pulse of the second switch control signal φ2. The fourth switch S12 is connected between the second output terminal of the multiplexer 64 and a first electrode of the second sampling capacitor Cs2, and the ground level voltage source GND. The fourth switch S12 is turned on in response to the pulse of the second switch control signal φ2. The fifth switch S22 is connected between a second electrode of the second sampling capacitor Cs2 and the ground level voltage source GND. The fifth switch S22 is turned on in response to the pulse of the first switch control signal φ1. The sixth switch S32 is connected between the second electrode of the second sampling capacitor Cs2 and the second input terminal (+) of the differential amplifier 65. The sixth switch S32 is turned on in response to the pulse of the second switch control signal φ2.

The differential amplifier 65 may be implemented as a fully differential amplifier having first and second input terminals, and first and second output terminals. The first integral capacitor Cint1 and the first reset switch Srst1 are connected in parallel to each other between the first input terminal (−) and a first output terminal (+) of the differential amplifier 65. The second integral capacitor Cint2 and the second reset switch Srst2 are connected in parallel to each other between the second input terminal (+) and a second output terminal (−) of the differential amplifier 65. The first and second integral capacitors Cint1 and Cint2 accumulate the sampled voltages. The first reset switch Srst1 connects both terminals of the first integral capacitor Cint1 in response to a reset pulse (not shown) and resets the first integral capacitor Cint1. The second reset switch Srst2 connects both terminals of the second integral capacitor Cint2 in response to the reset pulse and resets the second integral capacitor Cint2.

The first and second switch control signals φ1 and φ2 are out of phase with each other and have a frequency two times higher than the MUX control signal Cmux. The second switch S21 is turned on when the pulse of the first switch control signal φ1 is generated, and supplies the voltage from the first output terminal of the multiplexer 64 to the first sampling capacitor Cs1. The fifth switch S22 is turned on when the pulse of the first switch control signal φ1 is generated, and supplies the voltage from the second output terminal of the multiplexer 64 to the second sampling capacitor Cs2. Thus, when the pulse of the first switch control signal φ1 is generated, the first and second sampling capacitors Cs1 and Cs2 store the voltages of the signals Vin1 and Vin2 received through the multiplexer 64 and sample the signals Vin1 and Vin2.

The first and third switches S11 and S31 are turned on when the pulse of the second switch control signal φ2 is generated, and connect the first sampling capacitor Cs1 in series to the first integral capacitor Cint1. The first and third switches S11 and S31 then supply the voltage of the first sampling capacitor Cs1 to the first integral capacitor Cint1. The fourth and sixth switches S12 and S32 are turned on when the pulse of the second switch control signal φ2 is generated, and connect the second sampling capacitor Cs2 in series to the second integral capacitor Cint2. The fourth and sixth switches S12 and S32 then supply the voltage of the second sampling capacitor Cs2 to the second integral capacitor Cint2. Thus, when the pulse of the second switch control signal φ2 is generated, the first and second integral capacitors Cint1 and Cint2 accumulate the sampled voltages.

In FIG. 13, the arrows indicate the sampling timing in the double sampling according to the embodiment of the invention. And, φ01 and φ02 are switch control signals applied to the sampling switches when the sampling operation is performed only during the high potential period of the driving signal in one period of the driving signal in the related art.

During the high potential period of the driving signal, the voltage of the first signal Vin1 is a positive voltage higher than the second signal Vin2. As shown in FIG. 14, the multiplexer 64 supplies the first signal Vin1 of the positive voltage to the first sampling capacitor Cs1 and supplies the second signal Vin2 of the negative voltage to the second sampling capacitor Cs2 during the high potential period of the driving signal. Thus, during the high potential period of the driving signal, the first sampling capacitor Cs1 samples the first signal Vin1 of the positive voltage, and the first integral capacitor Cint1 stores the sampled positive voltage. During the high potential period of the driving signal, the second sampling capacitor Cs2 samples the second signal Vin2 of the negative voltage, and the second integral capacitor Cint2 stores the sampled negative voltage.

During the low potential period of the driving signal, the voltage of the second signal Vin2 is a positive voltage higher than the first signal Vin1. As shown in FIG. 15, the multiplexer 64 supplies the second signal Vin2 of the positive voltage to the first sampling capacitor Cs1 and supplies the first signal Vin1 of the negative voltage to the second sampling capacitor Cs2 during the low potential period of the driving signal. Thus, during the low potential period of the driving signal, the first sampling capacitor Cs1 samples the second signal Vin2 of the positive voltage, and the first integral capacitor Cint1 stores the sampled positive voltage. During the low potential period of the driving signal, the second sampling capacitor Cs2 samples the first signal Vin1 of the negative voltage, and the second integral capacitor Cint2 stores the sampled negative voltage.

The Rx driving circuit 34 according to the embodiment of the invention switches on or off the transmission path of the input signals using the multiplexer 64. Hence, when The Rx driving circuit 34 performs the double sampling in one period of the driving signal, the Rx driving circuit 34 may accumulate only the positive voltages in the first integral capacitor Cint1 of the integrator 66 and may accumulate only the negative voltages in the second integral capacitor Cint2 of the integrator 66.

The integrator 66 includes the positive output and the negative output. The output 'Vout(+)' of the positive voltage output through the first output terminal (+) of the differential amplifier 65 is 'Vout(+)=Vin×(Cs/Cf)+Δ'. On the other hand, the output 'Vout(-)' of the negative voltage output through the second output terminal (-) of the differential amplifier 65 is 'Vout(-)=-{(-Vin)×(Cs/Cf)}-Δ'. In the above output, Cs is the same as Cs1 and Cs2, Cf is the same as Cint1 and Cint2, Vin is the same as Vin1 and Vin2, and A is the noise component input along with the input signal Vin. Thus, the final output 'Vout(final)' of the integrator 66 is 'Vout(final)={Vin×(Cs/Cf)+Δ}+[-{(-Vin)×(Cs/Cf)}-Δ]=2 Vin×(Cs/Cf)'. As a result, the Rx driving circuit 34 according to the embodiment of the invention accumulates the signal voltages as shown in part (d) of FIG. 11 to increase the signal in the signal-to-noise ratio by more than twice as compared to the related art. Further, the Rx driving circuit 34 according to the embodiment of the invention cancels the positive noise and the negative noise out, thereby greatly improving the signal-to-noise ratio.

As described above, the embodiment of the invention periodically switches on or off the transmission path of the first and second signals received through the Rx lines and accumulates the signal voltages of the same polarity in the integrator, thereby implementing the double sampling in one period of the driving signal. As a result, the embodiment of the invention increases the accumulated voltages of the integrator and reduces the noise amount, thereby increasing the signal-to-noise ratio.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch sensing device comprising:
    a touch screen including Tx lines, Rx lines crossing the Tx lines, and touch sensors formed at crossings of the Tx lines and the Rx lines;
    a Tx driving circuit configured to supply a driving signal to each of the Tx lines; and
    an Rx driving circuit configured to double sample signals received through the Rx lines in one period of the driving signal, the signals generated on the Rx lines in response to the driving signals supplied to the Tx lines,
    wherein the Rx driving circuit includes:
    a multiplexer configured to receive first and second signals generated from double sampling of the signals received through the Rx lines and switch on or off a signal transmission path of the first and second signals; and
    an integrator configured to sample and integrate the first and second signals received from the multiplexer.

2. The touch sensing device of claim 1, wherein one period of the driving signal includes a high potential period and a low potential period,
    wherein the multiplexer supplies the first signal to a first sampling capacitor and supplies the second signal to a second sampling capacitor during the high potential period of the driving signal, and wherein the multiplexer supplies the second signal to the first sampling capacitor and supplies the first signal to the second sampling capacitor during the low potential period of the driving signal.

3. The touch sensing device of claim 2, wherein the integrator includes:
a first integral capacitor configured to accumulate positive voltages which are successively supplied from the first sampling capacitor twice in the one period of the driving signal;
a second integral capacitor configured to accumulate negative voltages which are successively supplied from the second sampling capacitor twice in the one period of the driving signal; and
a differential amplifier connected to the first and second integral capacitors,
wherein the first integral capacitor is connected between a first input terminal and a first output terminal of the differential amplifier,
wherein the second integral capacitor is connected between a second input terminal and a second output terminal of the differential amplifier.

4. The touch sensing device of claim 3, wherein the multiplexer switches on or off the signal transmission path in response to a MUX control signal,
wherein a period of the MUX control signal is substantially the same as a period of the driving signal, and a phase of the MUX control signal is later than a phase of the driving signal,
wherein the MUX control signal rises in the high potential period of the driving signal and falls in the low potential period of the driving signal.

5. The touch sensing device of claim 4, wherein the integrator includes:
a first switch which is connected between a node, between a first output terminal of the multiplexer and a first electrode of the first sampling capacitor, and a ground level voltage source and is turned on in response to a pulse of a second switch control signal;
a second switch which is connected between a second electrode of the first sampling capacitor and the ground level voltage source and is turned on in response to a pulse of a first switch control signal;
a third switch which is connected between the second electrode of the first sampling capacitor and the first input terminal of the differential amplifier and is turned on in response to the pulse of the second switch control signal;
a fourth switch which is connected between a node, between a second output terminal of the multiplexer and a first electrode of the second sampling capacitor, and the ground level voltage source and is turned on in response to the pulse of the second switch control signal;
a fifth switch which is connected between a second electrode of the second sampling capacitor and the ground level voltage source and is turned on in response to the pulse of the first switch control signal; and
a sixth switch which is connected between the second electrode of the second sampling capacitor and the second input terminal of the differential amplifier and is turned on in response to the pulse of the second switch control signal,
wherein the first and second switch control signals are out of phase with each other and have a frequency two times higher than the MUX control signal.

6. A double sampling method of a touch sensing device including a touch screen including Tx lines, Rx lines crossing the Tx lines, and touch sensors formed at crossings of the Tx lines and the Rx lines, the method comprising:
supplying a driving signal to each of the Tx lines; and
double sampling signals received through the Rx lines in one period of the driving signal, the signals generated on the Rx lines in response to the driving signals supplied to the Tx lines,
wherein the double sampling of the received signals includes:
receiving first and second signals generated from double sampling of the signals received through the Rx lines from a multiplexer and switching on or off a signal transmission path of the first and second signals; and
sampling and integrating the first and second signals using an integrator connected to the multiplexer.

7. The touch sensing device of claim 1, wherein the Rx driving circuit samples the signals received through the Rx lines once during a first half cycle of each period of the driving signal the Tx lines and once during a second half cycle of each period of the driving signal to the Tx lines.

8. The touch sensing device of claim 7, wherein the integrator integrates the first signal during the first half cycle of each period of the driving signal to the Tx lines and an inversion of the second signal during the second half cycle of each period of the driving signal to the Tx lines.

9. The touch sensing device of claim 7, wherein the driving signal is at a high potential during the first half cycle of each period of the driving signal to the Tx lines and at a low potential during the second half cycle of each period of the driving signal to the Tx lines.

10. The touch sensing device of claim 1, wherein the multiplexer switches on the signal transmission path of the first and second signals during the first half cycle of each period of the driving signal to the Tx lines and switches off the signal transmission path of the first and second signals during the second half cycle of each period of the driving signal to the Tx lines to invert polarities of the first and second signals.

11. The touch sensing device of claim 1, wherein the signals on the Rx lines are generated responsive to the driving signals to the Tx lines by mutual capacitance between the Tx lines and the Rx lines.

12. The touch sensing device of claim 1, wherein the signals on the Rx lines are voltage signals, and the first signal and the second signal are sampled voltages corresponding to the voltage signals on the Rx line.

13. The touch sensing device of claim 1, wherein the touch sensing device is formed on a substrate of a display panel together with a pixel array of the display panel in an in-cell type.

14. The touch sensing device of claim 1, wherein integrator integrates differences between the first signal and the second signal corresponding to adjacent Rx lines.

15. The double sampling method of claim 6, wherein the signals received through the Rx lines are sampled once during a first half cycle of each period of the driving signal to the Tx lines and once during a second half cycle of each period of the driving signal to the Tx lines.

16. The double sampling method of claim 15, wherein the first signal is integrated during the first half cycle of each period of the driving signal to the Tx lines and an inversion of the second signal is integrated during the second half cycle of each period of the driving signal to the Tx lines.

17. The double sampling method of claim 15, wherein the driving signal is at a high potential during the first half cycle of each period of the driving signal to the Tx lines and at a low potential during the second half cycle of each period of the driving signal to the Tx lines.

18. The double sampling method of claim 6, wherein the signal transmission path of the first and second signals is switched on during the first half cycle of each period of the driving signal to the Tx lines and switched off during the second half cycle of each period of the driving signal to the Tx lines to invert polarities of the first and second signals.

19. The double sampling method of claim 6, wherein the signals on the Rx lines are generated responsive to the driving signals to the Tx lines by mutual capacitance between the Tx lines and the Rx lines.

20. The double sampling method of claim 6, wherein the signals on the Rx lines are voltage signals, and the first signal and the second signal are sampled voltages corresponding to the voltage signals on the Rx line.

21. The double sampling method of claim 6, wherein integrating the first and second signals comprises integrating differences between the first signal and the second signal corresponding to adjacent Rx lines.

\* \* \* \* \*